US012015633B2

(12) United States Patent
Thomas et al.

(10) Patent No.: US 12,015,633 B2
(45) Date of Patent: Jun. 18, 2024

(54) SYSTEM AND METHOD FOR CONDUCTING SOCIAL ENGINEERING RED TEAM CAMPAIGNS

(71) Applicant: Thomson Reuters Enterprise Centre GmbH, Zug (CH)

(72) Inventors: Jason Thomas, Arlington, VA (US); Zach Seid, Arlington, VA (US); Blake Howald, Northfield, MN (US); James Tuttle, Fairport, NY (US); Spencer Torene, Potomac, MD (US); Hannah Lensing, Herndon, VA (US); Casey Fallin, Fort Campbell, KY (US); Matt Machado, Herndon, VA (US); Berk Ekmekci, Sterling, VA (US); William Garcia, Falls Church, VA (US); Nathan Maynes, Falls Church, VA (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 311 days.

(21) Appl. No.: 17/464,230

(22) Filed: Sep. 1, 2021

(65) Prior Publication Data
US 2022/0070204 A1 Mar. 3, 2022

Related U.S. Application Data

(60) Provisional application No. 63/073,191, filed on Sep. 1, 2020.

(51) Int. Cl.
*G06F 21/00* (2013.01)
*H04L 9/40* (2022.01)

(52) U.S. Cl.
CPC ...... *H04L 63/1433* (2013.01); *H04L 63/1483* (2013.01)

(58) Field of Classification Search
CPC ............ H04L 63/1433; H04L 63/1483
See application file for complete search history.

(56) References Cited

U.S. PATENT DOCUMENTS

2016/0308897 A1* 10/2016 Chapman ............ G06F 40/186
2017/0140663 A1 5/2017 Sadeh-Koniecpol
(Continued)

OTHER PUBLICATIONS

PCT International Search Report and Written Opinion for International Application No. PCT/US2021/048672, dated Dec. 17, 2021, 12 pages.

*Primary Examiner* — Kendall Dolly
(74) *Attorney, Agent, or Firm* — Antonio Papageorgiou; Lombard & Geliebter LLP

(57) ABSTRACT

Computer implemented methods are provided for facilitating social engineering campaigns. The methods generally include maintaining at least one database that includes metadata for a plurality of fictional personas, metadata for a plurality of potential targets, information for a plurality of social engineering campaigns, such as a plurality of campaign scenarios, and information regarding social engineering successes with respect to at least one fictional persona, at least one potential target, at least one social engineering campaign, or a combination thereof. The method further includes receiving a selection of a campaign scenario from the plurality of campaign scenarios, receiving a selection of at least one of the plurality of potential targets, and selecting at least one of the plurality of fictional personas for use in a social engineering campaign based on an expected effectiveness of the given fictional personas with respect to the selected targets.

20 Claims, 22 Drawing Sheets

(56) References Cited

U.S. PATENT DOCUMENTS

| | | | |
|---|---|---|---|
| 2018/0097841 A1 | 4/2018 | Stolarz | |
| 2019/0369856 A1* | 12/2019 | Torbey | G06F 3/048 |
| 2020/0082310 A1* | 3/2020 | Chapman | G06Q 10/107 |
| 2023/0081399 A1* | 3/2023 | Murphy | G06Q 10/06395 |
| | | | 705/7.42 |
| 2023/0244956 A1* | 8/2023 | Teleki | G06Q 30/0201 |
| | | | 706/46 |

* cited by examiner

Create Company

Choose a Country of Registration

France

Choose an Industry

Mining

Enter Keywords

Enter keywords, separated by spaces

Legends

[Create Legend]

| First Name | Last Name | Gender | Ethnicity | Country | City | Employer | Job |
|---|---|---|---|---|---|---|---|
| Ryan | Shelton | male | Caucasian | United States of America | MIAMI | Miller Oilfield, LTD | Chief Operation Officer |
| Ian | Owen | male | Caucasian | United States of America | BLOOMFIELD | Miller Oilfield, LTD | Chief Executive Officer |
| Brenda | Dominguez | female | Asian | United States of America | NEWPORT NEWS | Miller Oilfield, LTD | Software Engineer |
| Deborah | Lambert | female | Caucasian | United States of America | WESTERVILLE | Miller Oilfield, LTD | Chief Executive Officer |
| Lori | Thomas | female | African | United States of America | SOUTHFIELD | Miller Oilfield, LTD | Senior Vice President |
| Tammy | Johnson | female | Caucasian | United States of America | MINSTER | Miller Oilfield, LTD | Venture Partner |
| Jerry | Sullivan | male | Caucasian | United States of America | ALLEGAN | Miller Oilfield, LTD | Director |
| Brandon | Dean | male | Caucasian | United States of America | SMITHFIELD | Miller Oilfield, LTD | Investor |
| Robin | Stevens | female | Caucasian | United States of America | DENVER | Miller Oilfield, LTD | Analyst |
| Samantha | Cannon | female | Asian | United States of America | CHARLOTTESVILLE | Miller Oilfield, LTD | Chief Product Officer |

Fig. 4H

SYSTEM AND METHOD FOR CONDUCTING SOCIAL ENGINEERING RED TEAM CAMPAIGNS

RELATED APPLICATION

This application claims the benefit of U.S. Provisional Patent Application No. 63/073,191, filed on Sep. 1, 2020, which is hereby incorporated herein by reference.

COPYRIGHT NOTICE

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The present application relates to methods and systems for conducting "red team" campaigns, and more particularly for testing or otherwise assessing the vulnerability of an organization's network to adversarial attacks.

Social engineering attacks on an organization's network may result in significant damage to an organization, for example, from unauthorized access to confidential information. Social engineering red teams conduct campaigns to assess the vulnerability of an organization to such exploits. This typically involves polling organizational targets, for example, to acquire sensitive information (passwords) and/or gain access to the organization's network. Once access to the network is achieved, red teams may assess the ability of the organization's system to detect the intrusion.

The effectiveness of the campaign is dependent at least in part on the ability of the red team to identify vulnerable targets and to engage the targets with a convincing attack. Target identification involves data gathering and reconnaissance with respect to, for example, employee identities, email addresses, phone numbers, etc. In an organization with thousands of employees, this can be daunting and labor intensive. With respect to developing convincing attacks, custom exploits are better able to bypass the organization's intrusion detection system which may otherwise be able to catch more common attacks. Developing convincing custom exploits too can be labor intensive, particularly when dealing with sophisticated employees that are less likely to be misled.

Accordingly, there is a need for methods and systems for use in testing an organization's vulnerability to social engineering attacks more effectively and/or more efficiently than the processes currently employed for such testing.

SUMMARY

In one aspect, a computer implemented method is provided for facilitating social engineering campaigns. The method includes maintaining at least one database that includes metadata for a plurality of fictional personas; metadata for a plurality of potential targets, information for a plurality of social engineering campaigns, including a plurality of campaign scenarios; and information regarding social engineering successes with respect to at least one of: at least one fictional persona, at least one potential target, at least one social engineering campaign, or a combination thereof; receiving a selection of a campaign scenario from the plurality of campaign scenarios; receiving a selection of at least one of the plurality of potential targets; selecting at least one of the plurality of fictional personas for use in a social engineering campaign based on an expected effectiveness of the at least one of the plurality of fictional personas, the expected effectiveness determined based at least in part on metadata associated with the selected at least one of the plurality of potential targets; populating a communication template associated with the selected campaign scenario with metadata for a selected target and a selected fictional persona; sending a communication using the populated communication template to the selected target; and tracking interactions with the selected target.

In one embodiment, the step of selecting at least one of the plurality of fictional personas for use in the social engineering campaign is performed at least in part using at least one model trained to identify fictional personas.

In one embodiment, the at least one model is trained using metadata for a plurality of potential targets and success information associated therewith as input.

In one embodiment, the at least one model is trained using metadata for a plurality of fictional personas and success information associated therewith.

In one embodiment, the at least one model is trained using campaign parameters for a plurality of campaigns and success information associated therewith.

In one embodiment, the campaign parameters include communication channels and wherein at least one model is trained using success information associated with the communication channels.

In one embodiment, each of the scenarios has content associated therewith, and wherein the at least one model is trained using success information associated with the scenario content.

In one embodiment, the method further includes receiving a selection of a campaign goal and setting initial campaign parameters based on the selected goal.

In one embodiment, the initial campaign parameters comprise a communication channel, a scenario, and fictional persona metadata.

In one embodiment, at least some of the metadata for the plurality of potential targets is retrieved from one or more public sources.

In one embodiment, the method includes receiving at least one item of metadata for a fictional persona and generating using at least one model at least one other item of metadata for the fictional persona conforming to metadata received.

In one embodiment, the fictional persona is a company and the at least one item of metadata received comprises an industry type and location and wherein the at least one other item of metadata comprises a company name.

In one embodiment, the fictional persona is a company and at least one other item of metadata comprises company structure.

In one embodiment, the company structure includes a plurality of company employees and at least one company address.

In one embodiment, the fictional persona is a company and at least one other item of metadata comprises a domain name for the company website.

In one embodiment, selecting at least one of the plurality of fictional personas for use in a social engineering campaign includes providing an interface that includes a list of fictional personas, a list of potential targets, and at least one form element for a user to refine the list of fictional personas based on a score for the fictional personas regarding effectiveness of each of the fictional persona with respect to at least one of the potential target listed.

Additional aspects of the present invention will be apparent in view of the description which follows.

DETAILED DESCRIPTION

The present application provides computer implemented methods and systems for use in conducting "red team" social engineering campaigns. Red team campaigns generally test an organization's vulnerability to social engineering attacks, such as via spam, baiting, phishing, spear-phishing, smishing, vishing, etc. Social engineers conducting periodic testing in this regard that simulates an organization being under attack allows organizations to better understand and defend against social engineering threats.

Figure 1:
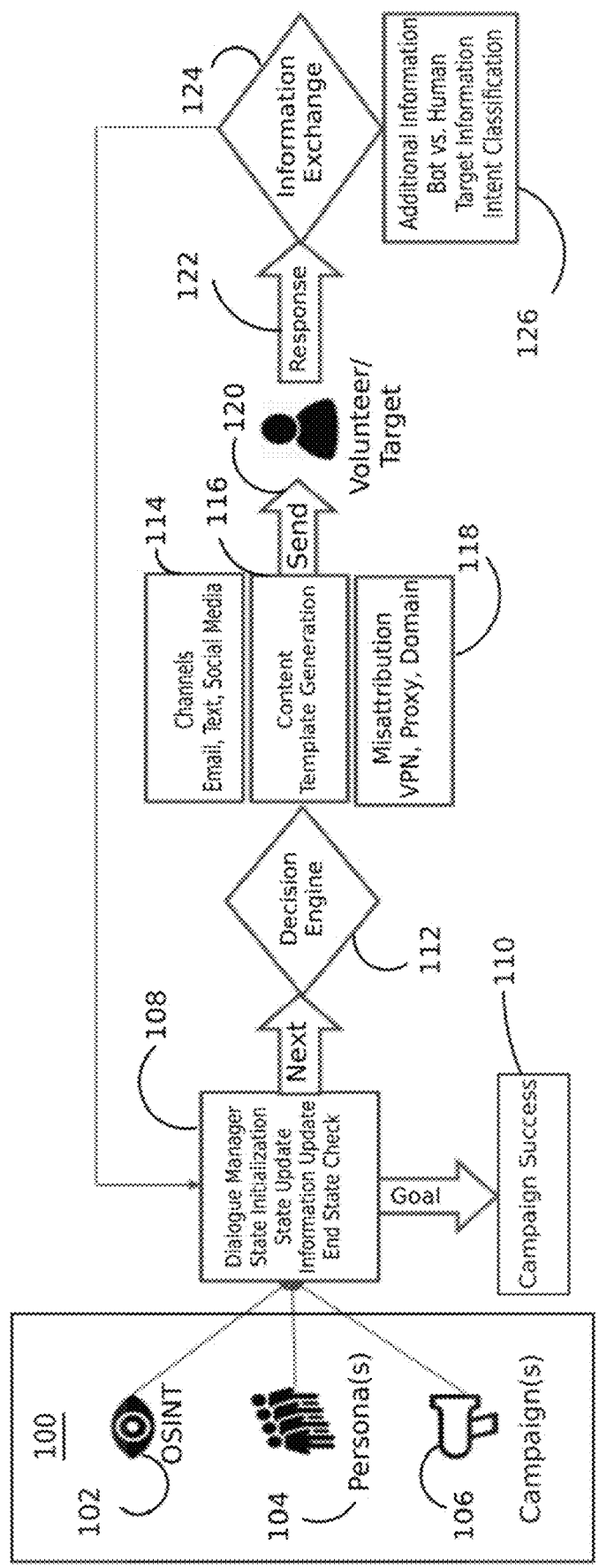
FIG. 1 is a block diagram depicting the overarching system flow for conducting red team campaigns according to at least one embodiment of the methods and systems disclosed herein.

Referring to FIG. 1, a computer implemented process that facilitates testing an organization's vulnerability with respect to social engineering attacks generally involves the following flow of information between the computer system components/participants: 1) taking a collection of inputs (content and metadata); 2) sending social engineering content to select volunteer/organizational targets; 3) facilitating subsequent interactions with the targets; 4) modeling successful interactions with the targets; and/or 5) iterating and refining the model through additional engagements with targets to increase social engineering attack effectiveness.

Organizational targets may be selected to receive social engineering content in various ways. For example, targets may be a pool of volunteers, or a set of the organization's personnel selected at random or based on an assessment with respect to their vulnerability to certain social engineering threats, or any combination thereof. For example, metadata and data relating to vulnerability may be collected for a pool of volunteers and a machine learning (ML) model may be trained and then retrained/refined to identify organizational targets using the data collected.

With respect to flow item (1), taking a collection of inputs (content and metadata), it is understood that various inputs can facilitate social engineering campaigns. In this regard, inputs 100 preferably include (a) metadata based on open source intelligence (OSINT) on volunteer and/or organizational targets 102, such as demographic data (name, gender, age, ethnicity, income, work situation, marital status, etc.), personal details (residence address, telephone number(s), email address(es), etc.), hobbies, etc. OSINT data may be retrieved from various sources, including social networking services or websites, such as Facebook®, Linked-In®, Instagram®, Google®, etc., as well various other sources on the web, such as the organization's webpage, third-party websites, etc. OSINT data may be supplemented with the volunteer and/or organizational target's known or estimated vulnerability to social engineering threats. OSINT data may therefore be stored in one or a plurality of databases associated with third-party computer networks. OSINT data may also be collected from such third-party sources and stored locally (with or without vulnerability data) by the organization or by a service provider for use as input as discussed herein.

In one embodiment, the inputs 100 include fabricated metadata associated with one or a plurality of fictional attacking personas 104, such as names and/or other demographic data thereof, employers (name, industry, etc.), locations (address(s)), education (school attended, degree earned, etc.), phone number(s), email address(es)/domain names, etc. The fictional attacking persona(s)/metadata 104 preferably conform to regional and cultural norms, and realistic patterns of life—ultimately bolstering their legitimacy and effectiveness in conducting red team campaigns. For example, the area code for the fictitious phone number(s) should match area codes for the given location. Similarly, the industry for the fictional persona may conform to the types of industries typically found at the location.

Figure 4B:
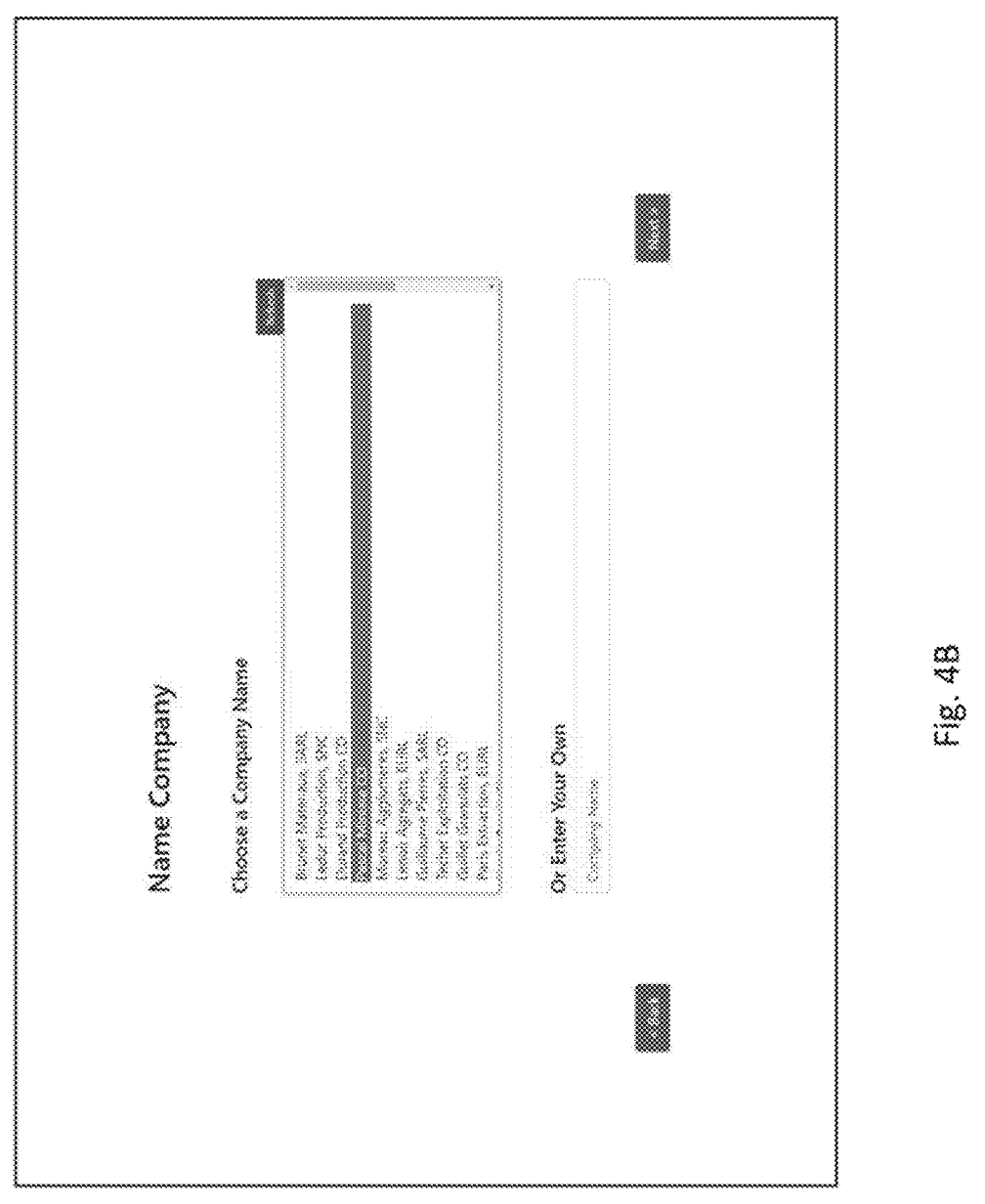

The ML model may be trained to create fictitious personas, as well as predict, provide suggestions, or evaluate any of the variables/metadata discussed herein relating to fictional personas. In this regard, the ML model may be trained using non-fictional as well as acceptable fictional personas based on feedback regarding campaign success to, inter alia, predict or evaluate fictional personas and/or any metadata thereof. The creation of the fictional persona/persona metadata may be accomplished by the system alone or based on input from the social engineer. For example, the computer system may display one or more interface screens with form elements therein for the user to input information regarding one or more items of metadata for the fictional persona being created, such as the interface shown in FIG. 4A. Input may include one or more of a fictitious name, employer name, telephone number, address, country, industry, keywords, etc. The model may, based on this input, suggest or evaluate any other fictional persona metadata information for conformance, such as company name (FIG. 4B), company logo (FIG. 4C), company structure (FIG. 4D), etc. Fictional attacking personal information may be stored in one or a plurality of databases associated with the organization and/or a third party service provider.

In one embodiment, the inputs 100 include a library of social engineering campaigns 106, which are generally associated with one or a series of pre-planned templated communications designed to achieve social engineering goals, e.g., click a link, acquire personal identifiable information (PII), annoy the target, etc. The templates are preferably designed to be populated automatically with OSINT and fictional persona metadata. The templates may be in any form appropriate for the desired channel of communication. For example, the template may be specific for generating an email, text message, social media message or post, automated phone calls, scripts for voice calls, etc. The campaigns 106 may be stored in one or a plurality of databases associated with the organization and/or a third party service provider. Interfaces may be provided for creating and/or maintaining a collection of templates, such as those shown in FIGS. 4k-4L.

The inputs 100 may be received/retrieved by a dialog manager (DM), which is generally a component in the computer system that is responsible for the state and flow of communications with a given target. The input channel for the DM preferably may also include as input responses/response information 122 from the target, as shown. The various states of communication with a given target may include any one or more of: initialization, update, information update, and end states.

As the name implies, the initialization state represents the state in which communication with a given target is started. In this state, inputs 100 are provided to or accessed by the decision engine 112, which may generate a first communication in a potential series of communications with the target. The update state represents a communication state after the initialization state. This state may occur, for example, based on receipt of a response to the first communication from the target, which may be provided to the decision engine 112 for the generation of a second communication in the series of communications with the target. The information update state may represent the state in which information in one or more databases is updated based on the receipt of information/metadata from the target, which may supplement the OSINT information maintained for the given target.

The end state represents that state in which the communication exchange with the target is terminated. This may occur, for example, if there is no response from the target within a certain time or upon the occurrence of the desired action/goal by the target, e.g., the target clicking a link in a computer generated message, providing confidential information (ID and password) via a fake website or a response, downloading malware, etc. Positive results with respect to the desired goals may be tracked, and campaign successes and the metadata associated therewith may be stored for later use by the organization, the system/model, etc. For example, information from positive results may be fed back into the system/model to improve efficacy of the model and/or system in, inter alia, identifying targets, creating fictional personas, selecting campaign scenarios and content, etc. The organization may use these results to improve training or other activity designed to reduce social engineering vulnerability.

With respect to flow item (2), the system sending social engineering content to select organizational targets 120, the inputs may be coordinated into one or more campaigns where the system associates the inputs 102, 104 with authored content (both manually created and templated) with respect to one or more campaigns 106. For example, a campaign template containing content 116, such as the template shown in FIG. 3, may be populated with OSINT metadata 102, as well as fictional persona metadata 104 from the collection of inputs 100. The system is preferably configured to generate communications/messages for one or a plurality of different types of communication channels 114, as discussed above. In this regard, the decision engine 112 may produce various types of communications directed to the target, using third party communication technology assets (e.g., email and social media accounts, automated phone systems, etc.) and may send 120 communication/messages to the selected targets. The system may further be configured to maintain the sender's anonymity, including using misattribution techniques/technologies 118 via, for example, VPNs, Proxies, Domains, etc.

For flow item (3), facilitating subsequent interactions with the targets, the system is preferably configured to track metadata associated with any interaction with the targets, such as the channel of communication, time of day, etc., with respect to communications sent, whether the target responded to a communication/message 122, and when, and what information was provided in the response from the target. This information may be stored in association with the various inputs noted above.

For flow item (4), modeling successful interactions with the targets, when the target responds 122 with information that the social engineering campaign was designed to capture, the system may then extract 124 and store 126 the metadata associated with the interactions for use, doe example, in training/retraining/refining the model. The system preferably also labels the interaction and the associated metadata from positive outcomes a success. If the target does not respond, the system may similarly label the interaction with the given target a failure. This information may be indicative of the vulnerability of the target and may thus be stored in association with the target and/or OSINT information as an indication of target vulnerability.

For flow item (5), iterating and refining the model through additional engagements with targets to increase social engineering attack effectiveness, after multiple iterations with targets and machine (reinforcement) learning based on sending messages to multiple volunteers and/or organizational targets, the model should become increasingly robust and adaptable to different organizations and compositions of targets. The turn-around for applying the system trained based on volunteer targets and/or targets associated with an organization, as discussed herein, to different organizations may be quite fast (matter of days) as the system models susceptibilities that apply to human behavior rather than any variables specific to an organization.

Figure 2:
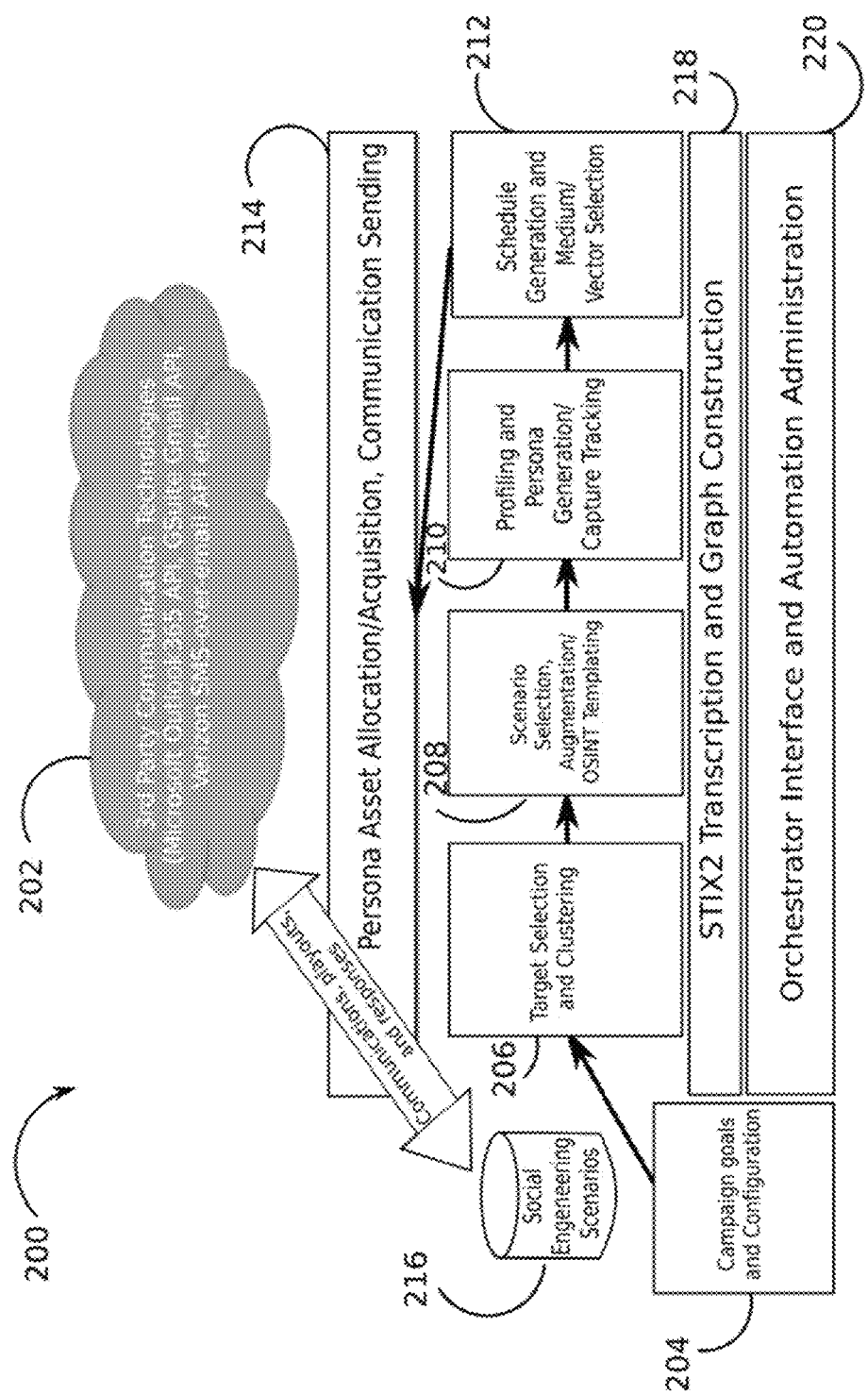
FIG. 2 is a block diagram depicting a method for conducting red team campaigns according to at least one embodiment of the methods disclosed herein.

FIG. 2 is a block diagram depicting a method for the orchestration of information and assets according to at least one embodiment of the methods discussed herein. The model that the system ultimately builds not only works to refine attack effectiveness through reinforcement learning but can preferably be reported out in a shareable format (e.g., Structured Threat Information Expression (STIX)) for use by cybersecurity professionals across the industry and governments.

In one embodiment, the method begins with one or more predefined campaign goals being entered/selected into the system at 204—e.g., attempt to get PII, attempt to get system credentials, attempt to learn about volunteer/target's social network, etc. Goal selection may be achieved by displaying an interface screen at a client device for receiving the selection, as discussed in the example further below and with respect to FIGS. 4I-4J. Each of these predefined goals may have an associated model of factors that contribute to successfully achieving goal; factors such as type of communication (email, text, social media), subject matter of the scenario (pets, sports, politics), fabricated metadata associated with fictional persona, time of day to send, etc.

At 206, given the goal and/or factors entered at step 204, the system may then select the appropriate volunteer/organizational targets or cluster of targets, preferably selected to maximize achievement of the campaign goal. In one embodiment, the system/model preferably uses as input the OSINT and any associated information (e.g., vulnerability) to select targets. At 208, given the goals and targets selected at 204-206, the scenarios and the associated communication templates, and the metadata for filling slots in the communication templates may then be selected/retrieved and loaded into the system.

At 210, given selections at steps 204-208, fictional personas 104 may then be selected by the system and/or the user for use in the campaigns 106. Fabricated metadata associated with the selected fictional personas 104 may then be pulled from the database and used to fill the campaign templates. At 212, once 204-210 are complete, the system may then schedule the sending of the communication/message to the selected targets, the details of which may be entered into a graph schema and associated database(s) 218. The database(s) may track activity for subsequent analysis, metrics reporting, model updating/refinement, etc.

The system may provide an interface 220 for orchestrating and/or automating the campaigns. The interface 220 generally provides one or more interface screens that facilitate entry of information and management of the campaign with respect to the steps and functions discussed herein, including sending communications 214, which coordinates with assets that exist in third party communication providers 202 and a database of communication templates 216 organized by the scenarios selected in step 208.

The following example outlines a process for executing a social engineering campaign:
 (A) Define initial goals
  a. Goals
   i. get PII
   ii. get system credentials
   iii. get volunteer social network
   iv. . . . .
  b. Given selection iii., set initial campaign parameters based on a model of factors associated with goal (based on highest likelihood of success):
   i. Channel: text
   ii. Scenario: interest in "bring your pet to work day"
   iii. Fictional Persona Metadata: Name—Tom Jones, Occupation—Pet Groomer, Address— . . . , Pet Pictures— . . . .
   iv. Sending Time: Thursday Afternoons
  c. Optionally edit initial campaign parameters
   i. Channel to: Email
 (B) Select most susceptible target(s) given existing target metadata based pm iii.:
  a. John Doe: single, physicist, Ph.D., has cat, biking enthusiast, . . . .
  b. Jane Doe: married, CFP, MBA, has two dogs, hiking enthusiast, . . . .
  c. . . . .
 (C) Select communication template from database
  a. Template shown in FIG. 3
 (D) If not selected already, select fictional persona given campaign parameters and/or target metadata
 (E) Populate template with target and fictional persona metadata
 (F) Schedule communication
  a. Following Thursday afternoon
 (G) Send communication using third party communication technology assets
  a. Email
 (H) Track interactions
  a. Hyperlink selected
  b. Petition data provided In this example, an interface screen may be displayed at a client device associated with the user/social engineer, which includes one or more form elements that allows users to specify one or more goals for the red team campaign. In this instance, a dropdown menu or radio buttons may be provided with options for the user to select one of a set of available goals (i-iv). Here, the user selected option iii, which results in the system setting initial campaign parameters or model factors to those that are most likely to succeed in getting access to the target's social media network, i.e., channel=text, scenario="bring your dog to work day", etc.

The system may display an interface screen with this information prepopulated into editable form elements. For example, the user may opt instead for the channel to be an email and the fictional persona metadata may be changed from a LA groomer to a NY vet.

Thereafter, the predicted/selected model factors may be used by the computer system to select one or a set of targets based on relevance with respect to the target's metadata (i.e., the target has a pet dog). The system may filter the targets based on their susceptibility to the simulated social engineering attack. For example, the system may select 20 targets most likely to select a hyperlink relating to their pet in an email. The set of targets may be displayed individually selectable by the user for targeted communications in the campaign. Interface screens that facilitate such functionality are shown in FIGS. 4I-4J.

Figure 3:
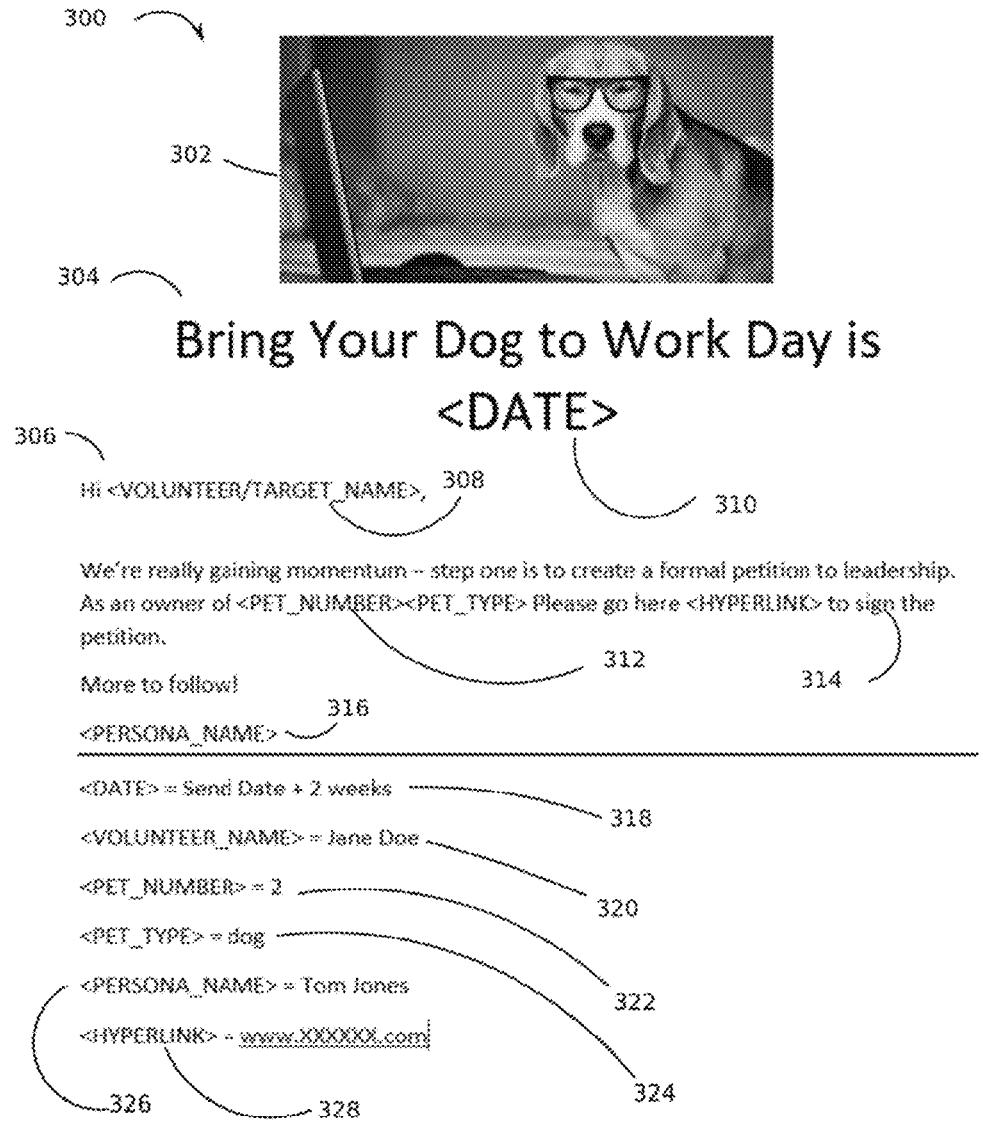
FIG. 3 is an exemplary template for use in conducting red team campaigns according to at least one embodiment of the methods and systems disclosed herein.

Once one or more targets are selected, a template associated with the scenario is retrieved by the system, such as the template shown in FIG. 3. The template 300 may include media 302, such as photos, embedded video, etc., relating to the scenario. The template preferably includes elements typical for the channel/scenario, such as a subject 304, salutation 306, message body 314, etc. The template preferably includes scenario variables, such as relevant dates 310, target metadata 308, 312, and fictional persona metadata 314, 316, etc.

The system selects or provides a list of fictional personas or legends for use with the campaign. Preferably, the system filters or selects the persona most likely to achieve the goal. Interface screens for facilitating the selection of personas are shown in FIGS. 4P-4R. As can be seen, the personas may be matched based on the target(s) selected for the campaign.

The system may then populate the template variables with the relevant metadata and any additional information, which may include a hyperlink associated with the fictional persona that solicits interaction by the target. In the example shown in FIG. 3, a hyperlink is provided that, if selected, purportedly leads to a petition for management to implement a "bring your dog to work day". Thereafter, the message may be scheduled according to the target's metadata, for example, and this and other interactions may be tracked as discussed above.

As discussed herein, the system may generate and display various interface screens to facilitate the red team social engineering campaign. In one embodiment, the system generates one or a series of interface screens that facilitate the creation of fictional personas and the metadata associated therewith. That is, after planning a red team campaign, the attacker or social engineer will need to create fictional attacking personas bolstered by metadata and a backstory to appear legitimate to a target. In this regard, the system may display a first interface screen, such as that shown in FIG. 4A, which includes form elements for the user to specify metadata associated with this persona, such as the country and industry, as well as keywords. In this example, the user is creating a fictitious mining company based in France. The system then generates potential names based on research into company names in France, such as the company names shown in the interface of FIG. 4B. In addition to system generated names, the system may accept names from the user in a text box type form element, as shown.

Figure 4C:
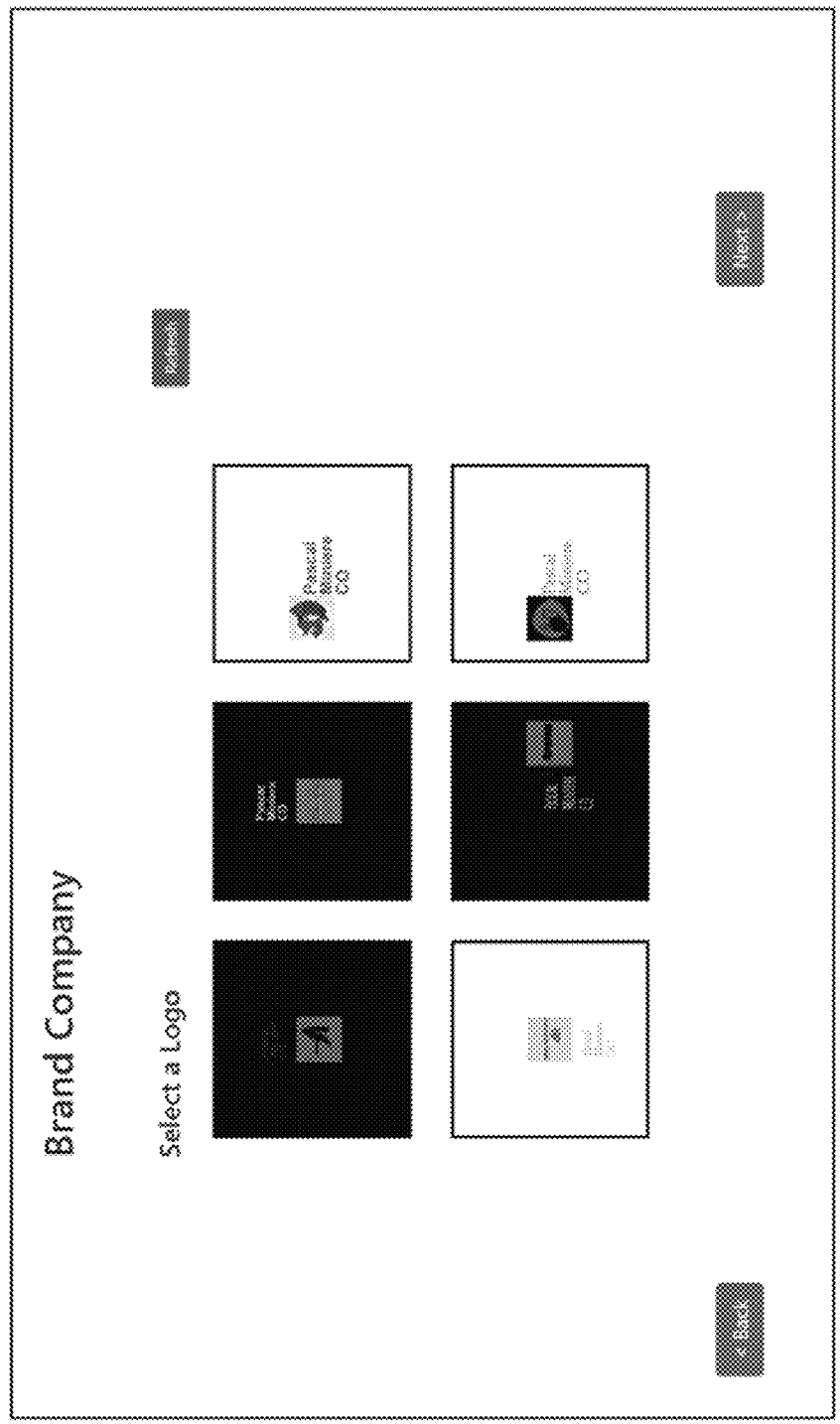
FIGS. 4A-4R depict exemplary interface screens for use in conducting red team campaigns according to at least one embodiment of the methods and systems disclosed herein.
Figure 4D:
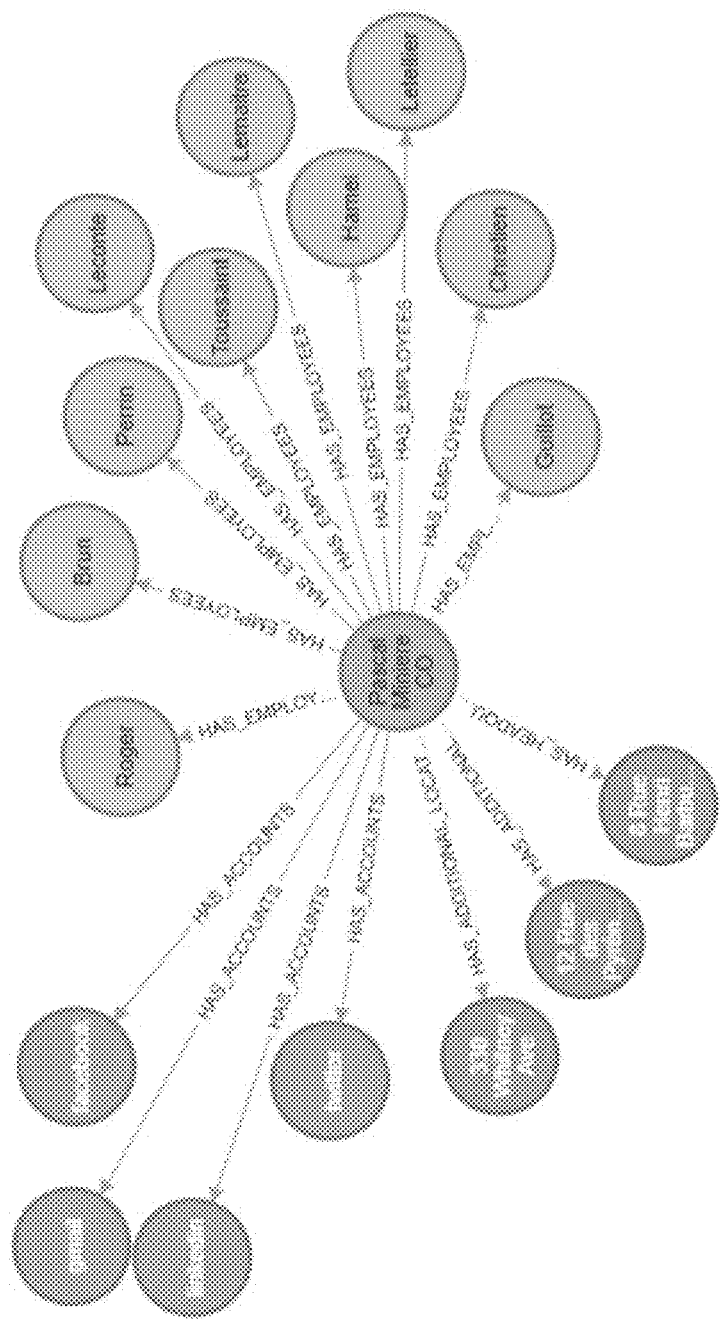
Figure 4E:
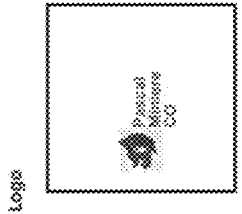

The system may then recommend potential company icons, as shown in FIG. 4C, and a fictitious organizational structure for the company, as shown in FIG. 4D. The system may populate the organization structure with employee names, addresses, social media accounts. Once complete in this regard, the system may generate a company description reviewable by the user, as shown in FIG. 4E. This description may be used for provisioning assets, such as a system generated webpage.

Figure 4F:
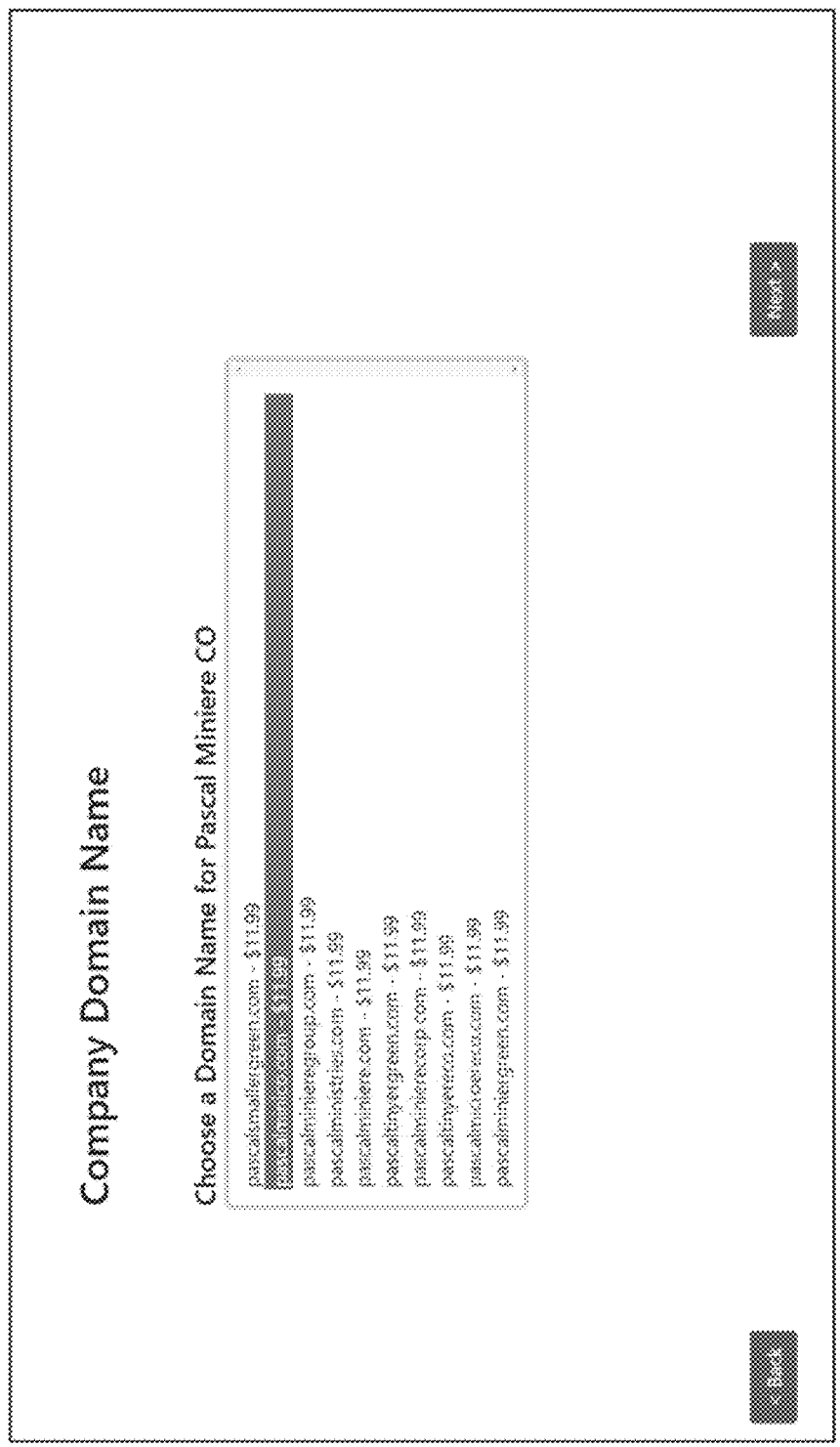
Figure 4G:
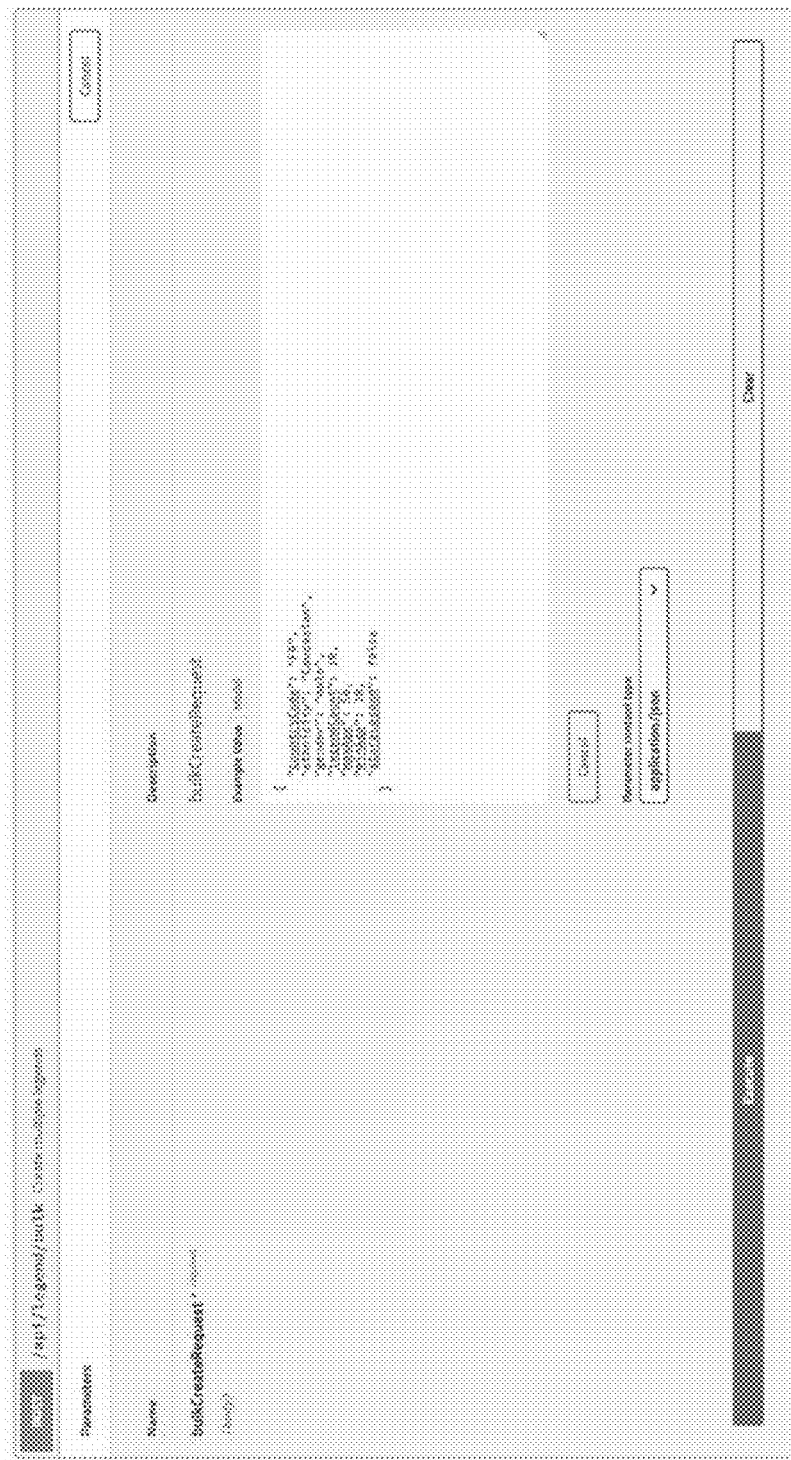
Figure 4I:
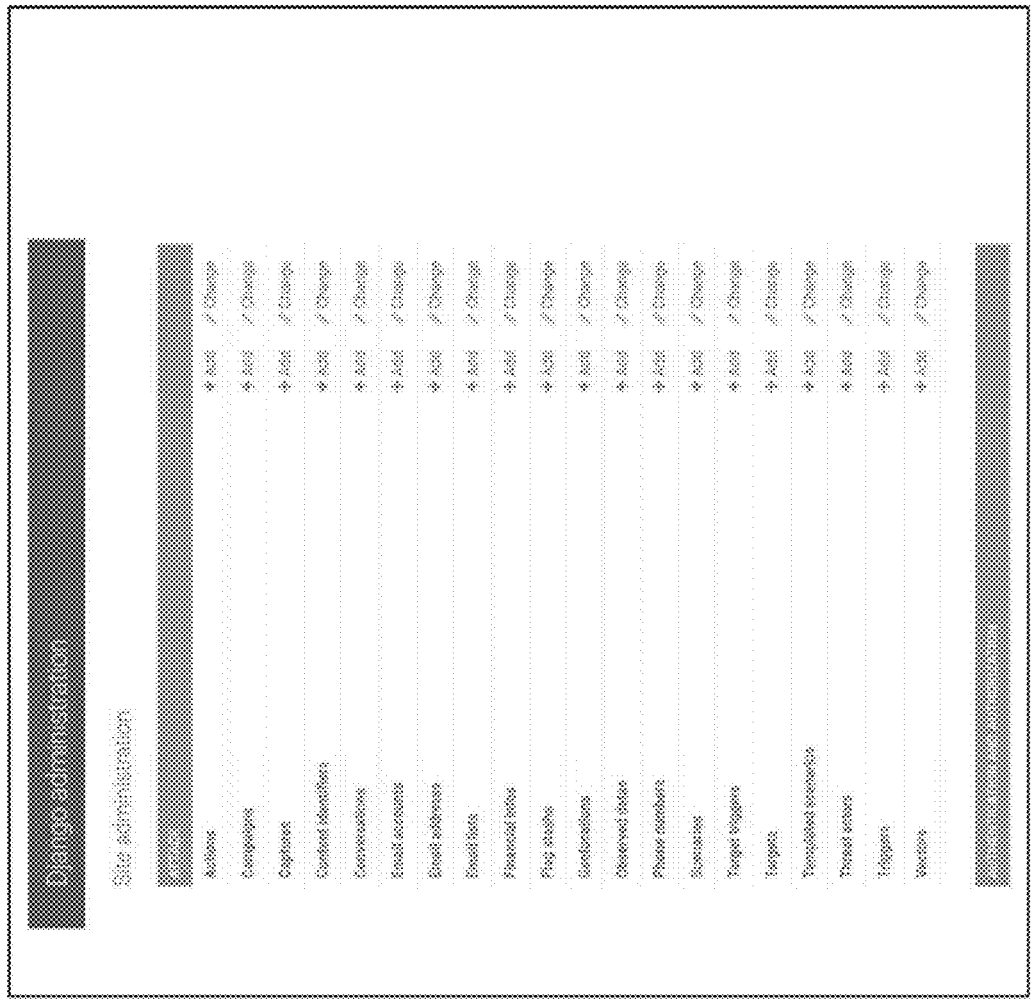
Figure 4J:
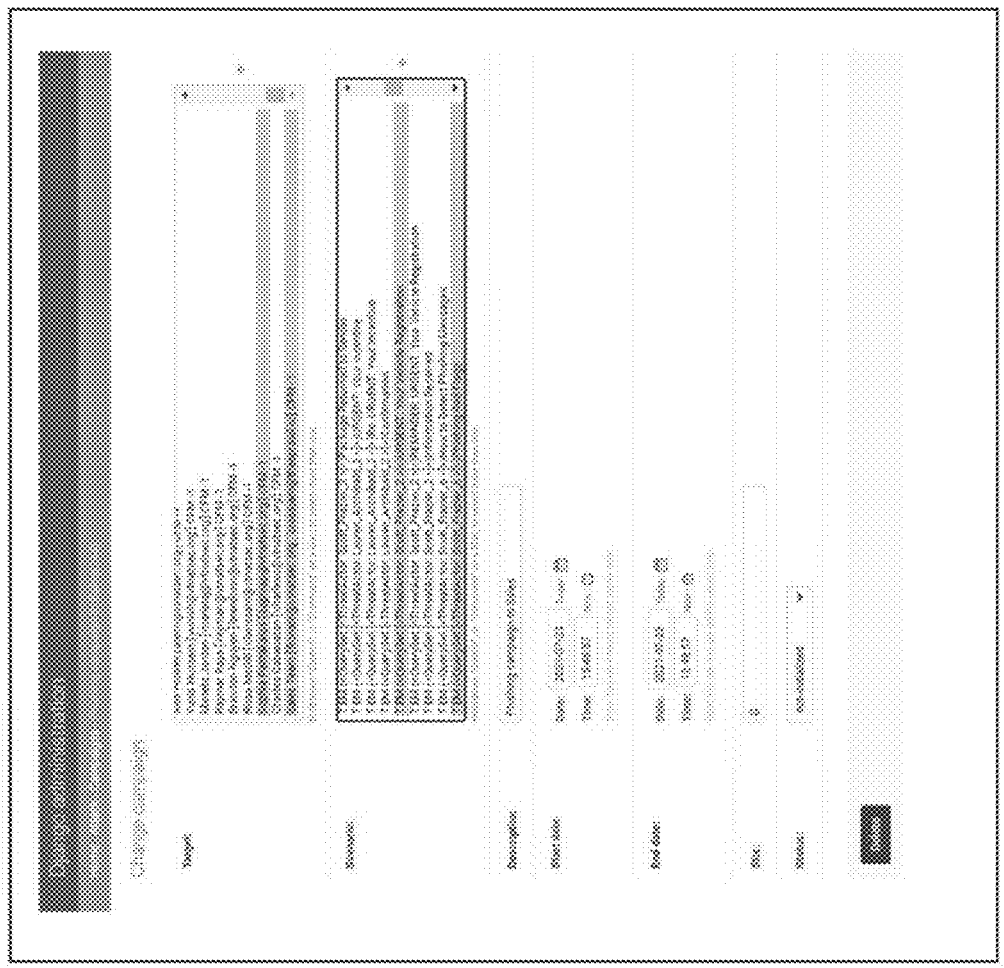

Preferably, the system facilitates the user with respect to the provisioning assets for the fictitious persona, including setting up web domains, web pages, email services, social media accounts, employees, etc., that match the fictitious company and the individuals purportedly associated with the company. For example, the system may generate a page, as shown in FIG. 4F, which allows the user to select and purchase a domain suggested by the system based on the fictitious company name. The system may also provide a tool for generating bulk parameters, such as employee names and associated metadata (including email addresses, addresses, phone numbers, etc., as shown in FIGS. 4G-4H. The system may facilitate review of the fictitious individuals (legends) and allows for editing and other modifications in advance of a red team campaign.

Once legends and associated metadata and assets for the fictional personas are created, the attacker can work through the elements of the red team campaign. These elements include defining a campaign, creating and modifying content, e.g., for templates, and selecting targets for the red team communications. In this regard, the system may display an interface screen containing a list of options that may be added and/or edited for the campaign, such as the interface shown in FIG. 4I.

The system may generate a campaign content management interface, such as the interface shown in FIG. 4J. In this interface, the system preferably includes therein a list of selectable targets and/or scenarios. As discussed above, the list of targets may be filtered based on vulnerability with respect to the selected scenarios. This interface may also include form elements for the user to specify start and end dates and times for the campaign.

Figure 4K:
Figure 4L:
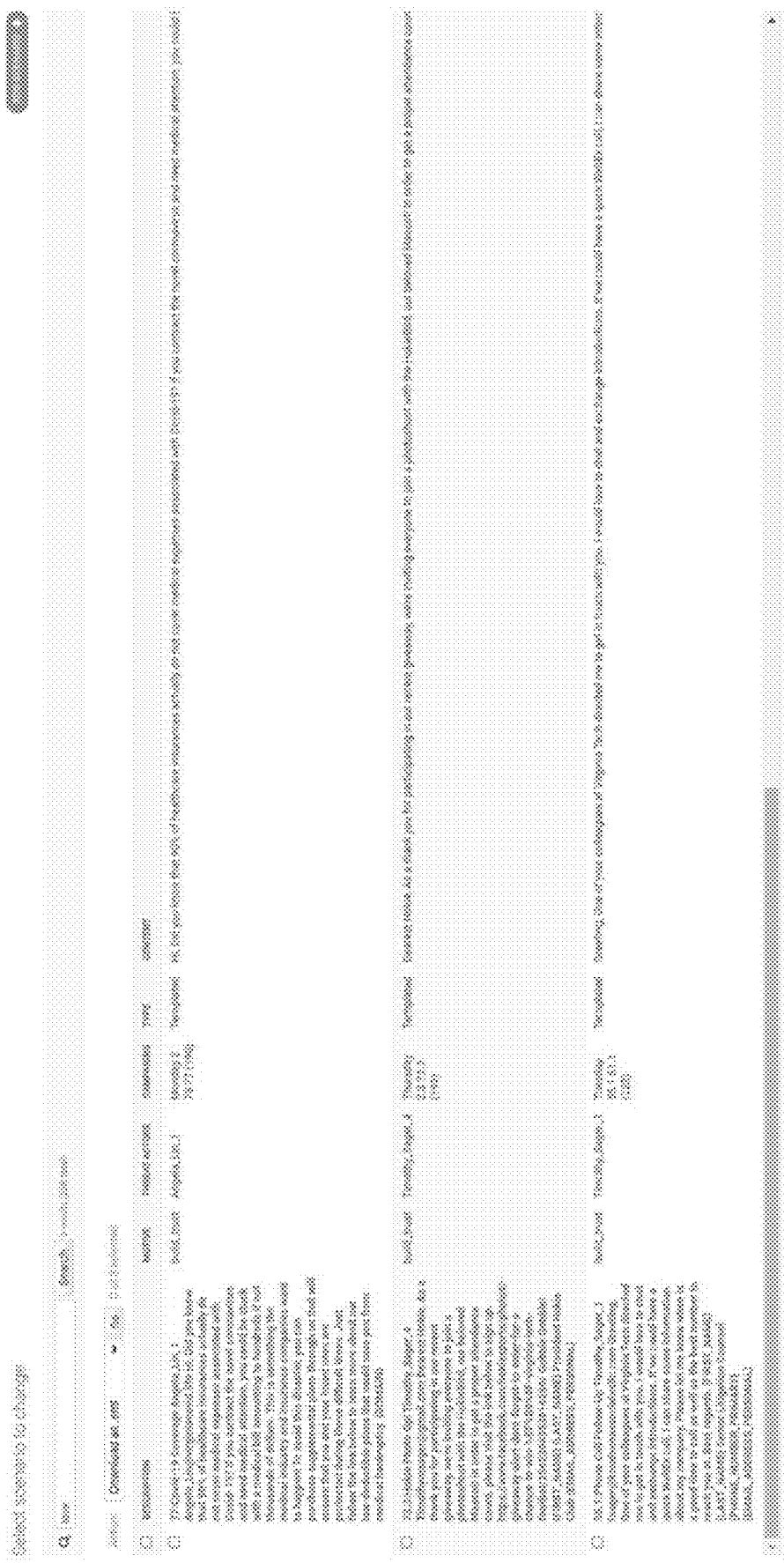

The system may generate one or more red team campaign content management interfaces, such as those in FIG. 4K-4L, for reviewing content for templating. This interface may include, for example, elements to create and edit content for templates, such as content for email messages. The interface may also include a search function for users to identify templates based on keywords.

Figure 4M:
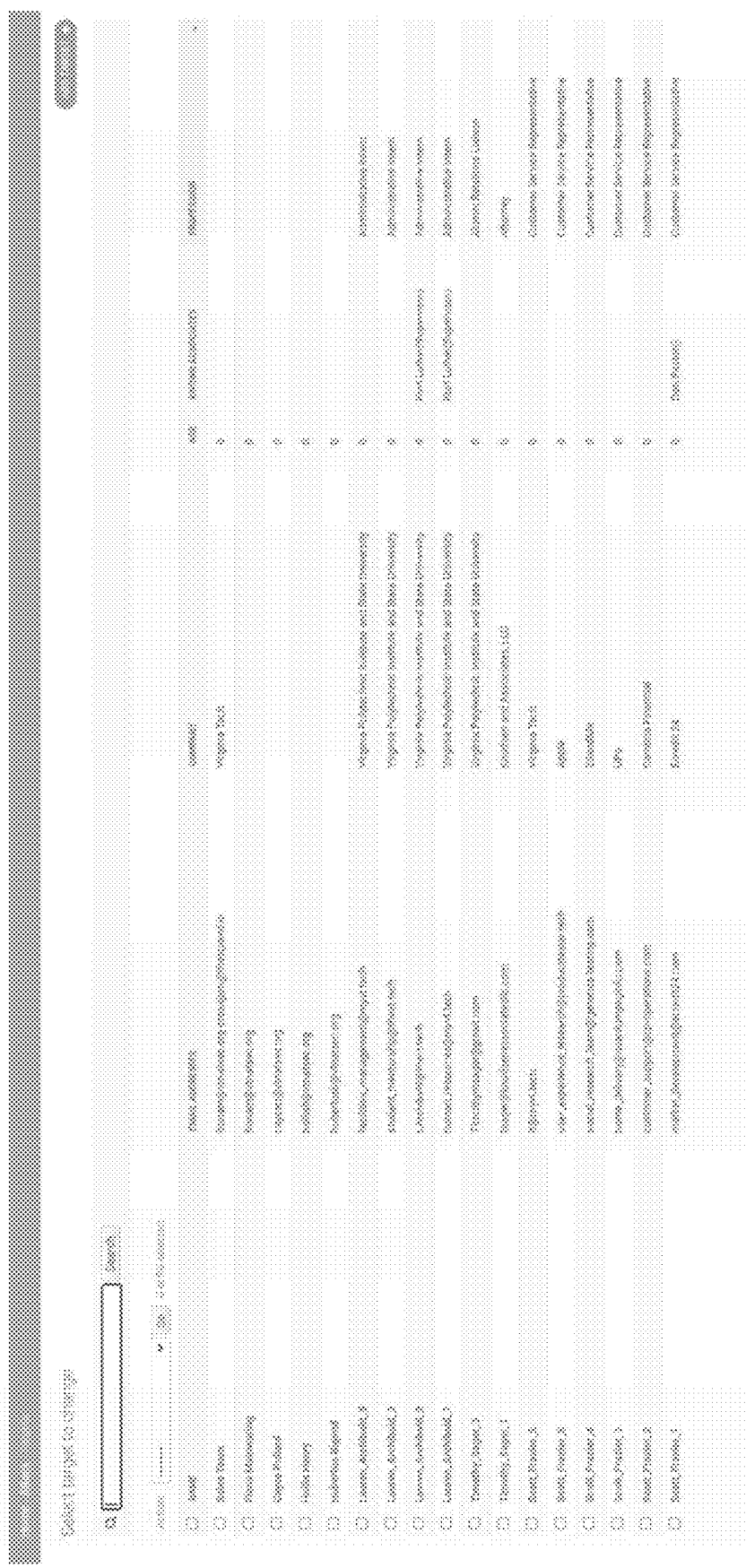
Figure 4N:
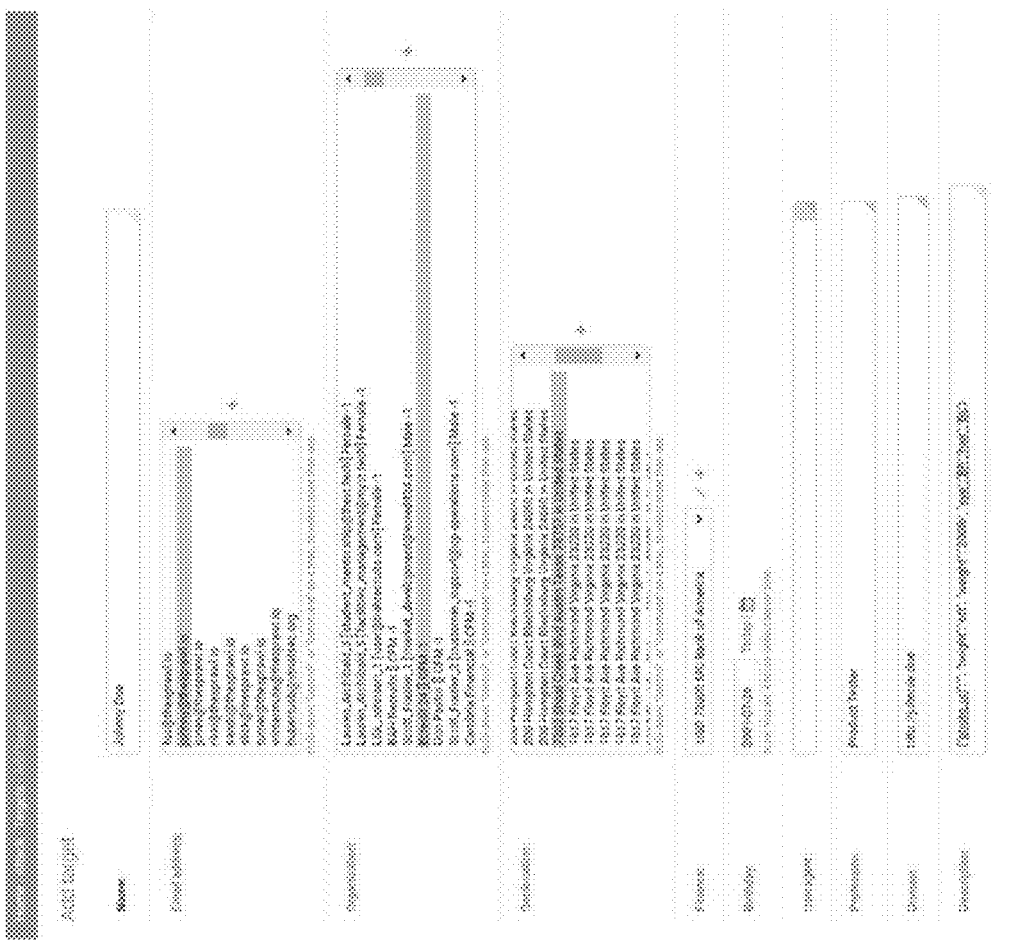
Figure 40:
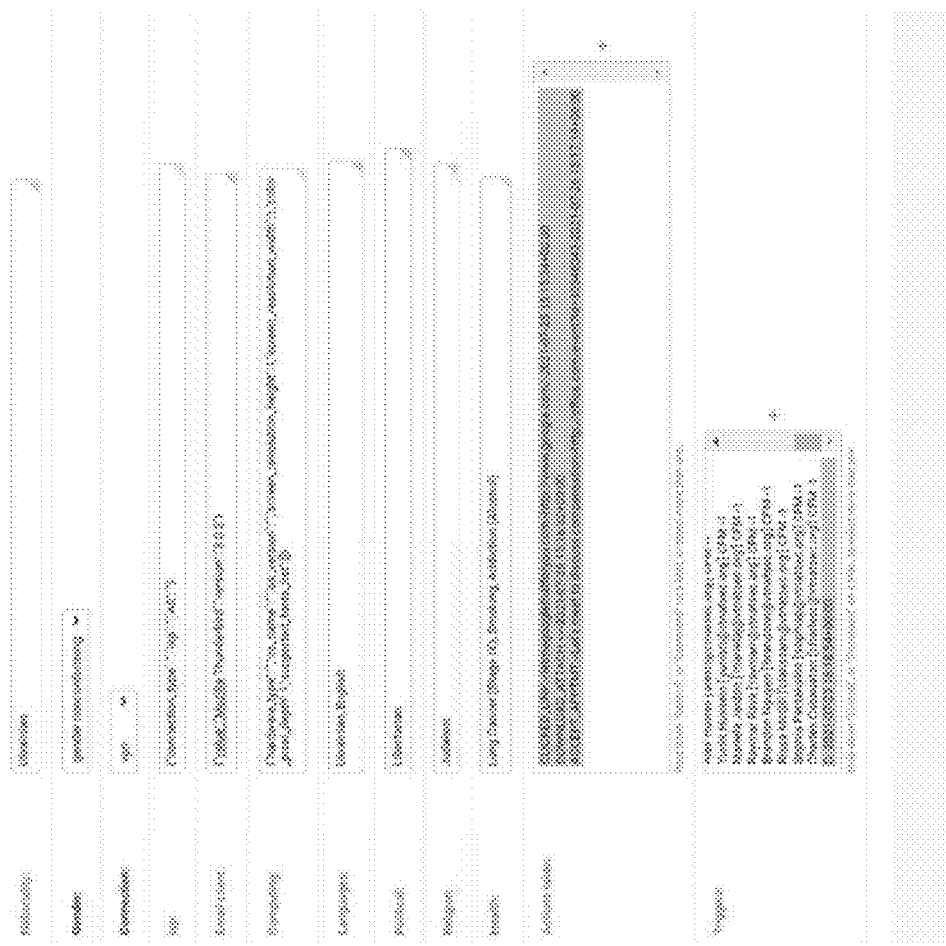
Figure 4P:
Figure 4Q:
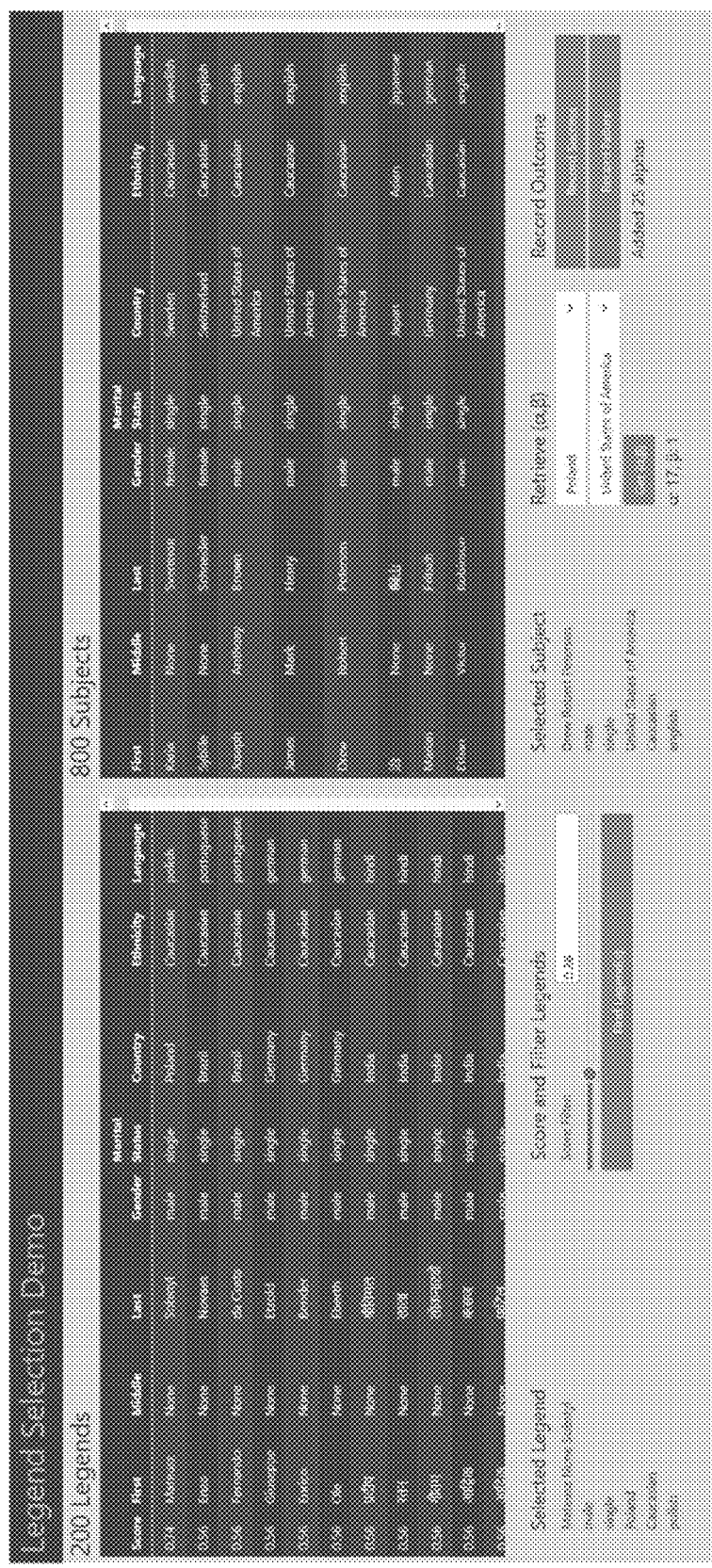
Figure 4R:
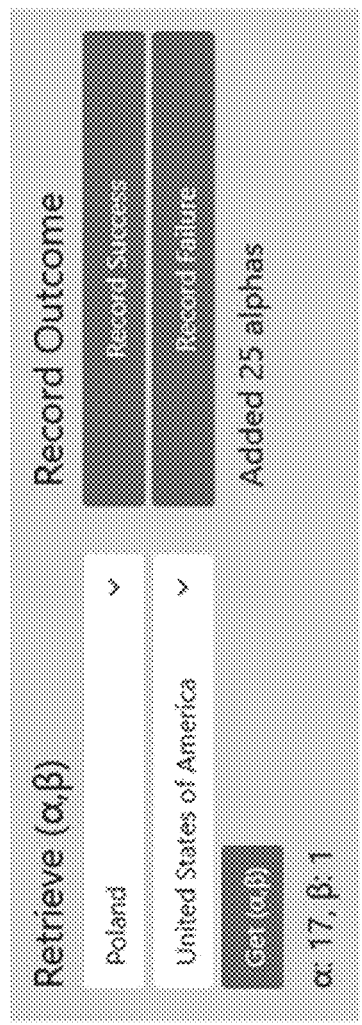

The system may provide an interface for campaign target maintenance, such as that shown in FIG. 4M. This interface may include a list of potential targets and associated metadata, such as name, email address, employer, known associates, etc. This metadata may be provided/edited via interfaces with form elements therein for the user to specify such data, such as those shown in FIGS. 4N-4O. The user may be able to provide feedback in terms of the success, failure, or other observations regarding red team campaigns (e.g., did the target respond, did the target report the communication as spam, did the target click on a link, etc.).

The system may provide functionality to statistically model optimal pairings between personas/legends and targets ('subjects') metadata and other aspects of the campaign (e.g., which assets were used, what content was used, etc.). In this regard, an interface may be displayed that includes a listing of available legends and subjects, as shown in FIG. 4P. The interface may include form elements, such as buttons, drop down menus, sliders, etc., for the user to refine these lists. As shown in FIG. 4P, the form elements may include a slider for specifying a minimum score, and drop-down menus for legend features (metadata) and subject features (metadata). The system may begin by setting a minimum score filter and the user may select the "Find Legends(s)" button, as shown, to refine the list of legends and/or subjects based on the filter criteria. When the "Find Legend(s)" is pressed, the system scores all available legends based on the expected effectiveness of their combination of attributes/metadata on the combined attributes/metadata of the selected subject. Scores may be between 0.0 and 1.0, reflecting the average of the probabilities that the legend's attributes are more favorable than all other potential attributes in their category. As shown in FIG. 4Q, the legends may be sorted based on score for the target: Drew Robert Petersen.

Once an interaction takes place, the outcome of the interaction can be recorded as either a success or failure. These events reinforce the underlying learning system to increase or decrease the expected performance of the legend's attributes when matched up with the subject's attributes. Over time, with reinforcement of successes and failures, the system can learn optimal attribute and legend recommendations. The "Retrieve $(\alpha,\beta)$" interface allows the user to view the number of successes $(\alpha)$ and failures $(\beta)$ for any pair of attributes the system has seen so far.

Figure 5:
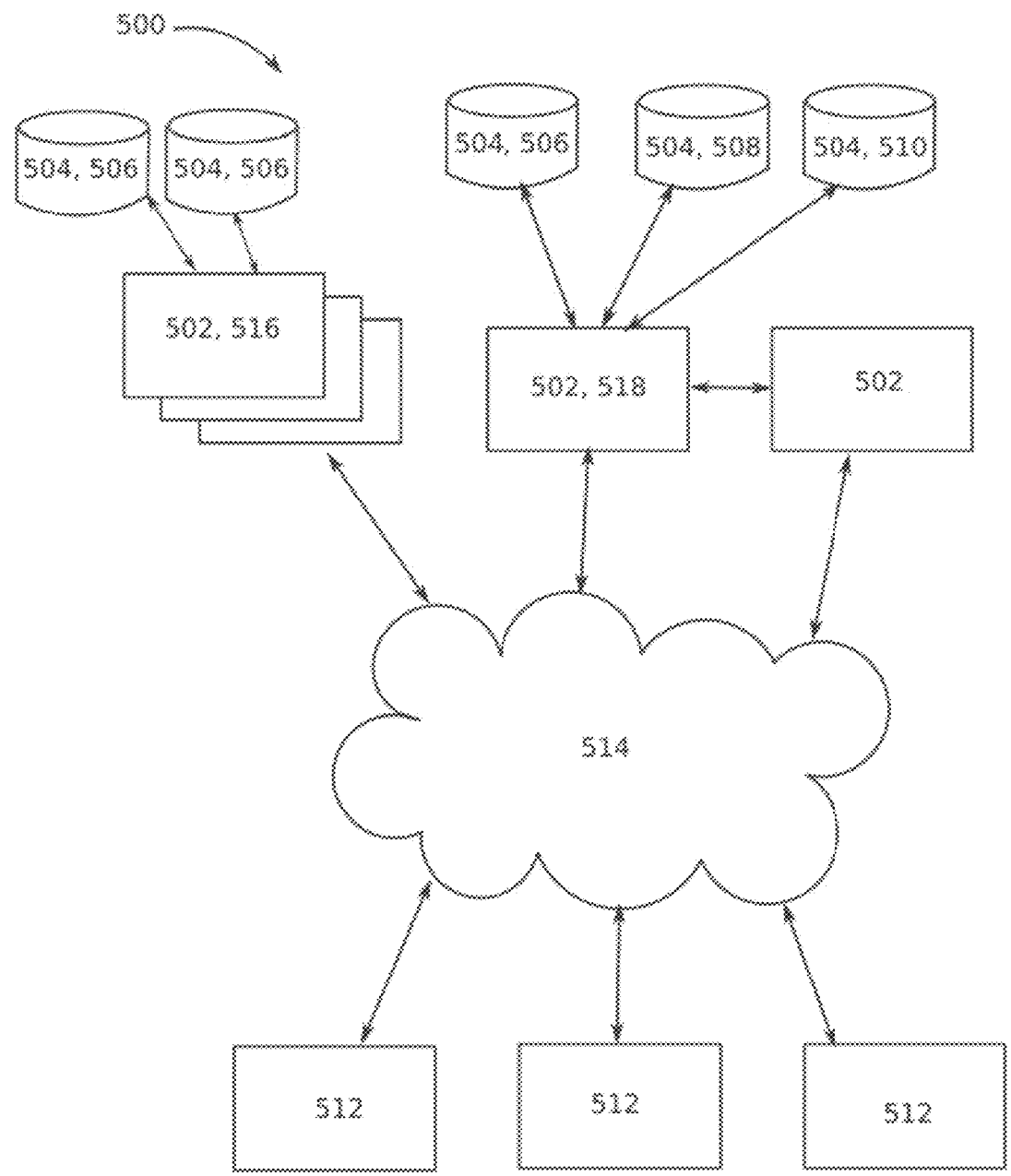
FIG. 5 a block diagram of a system for the automatic categorization of textual content according to at least one embodiment of the systems disclosed herein.

FIG. 5 shows an exemplary system for use in facilitating social engineering campaigns is shown. In one embodiment, the system 500 includes one or more servers 502, coupled to one or a plurality of databases 504, such as OSINT databases 806, fictional persona databases 508, campaign databases 510, etc. The servers 502 may further be coupled over a communication network to one or more client devices 512. Moreover, the servers 502 may be communicatively coupled to each other directly or via the communication network 514, as shown.

The OSINT databases 506, preferably, include metadata for a plurality of potential targets, as discussed above. This metadata may be maintained by one or a plurality of third party providers via respective third party provider servers 516. The organizational computer server 518 may access the third party OSINT databases 506 and may maintain a subset of the third party OSINT databases 506 pertaining to the organizations potential targets. The fictional persona databases 508 contain metadata associated with the fictional personas. Campaign databases 510 may include information pertaining to the campaign, including content as discussed above.

The servers 502 may vary in configuration or capabilities, but are preferably special-purpose digital computing devices that include at least one or more central processing units and computer memory. The server(s) 506 may also include one or more of mass storage devices, power supplies, wired or wireless network interfaces, input/output interfaces, and operating systems, such as Windows Server, Unix, Linux, or the like. In an example embodiment, server(s) 502 include or have access to computer memory storing instructions or applications for the performance of the various functions and processes disclosed herein, including tracking campaign information, and maintaining the model discussed above. The servers may further include one or more decision engines and related interface components, for administering social engineering campaigns, as discussed above, and presenting the results of the campaigns to users accessing the service via client devices 512. The interface components generate web-based user interfaces, such as the interfaces shown in FIGS. 4A-4R, over a wireless or wired communications network on one or more client devices.

The computer memory may be any tangible computer readable medium, including random access memory (RAM), a read only memory (ROM), a removable storage unit (e.g., a magnetic or optical disc, flash memory device, or the like), a hard disk, or etc.

The client devices 512 may include a personal computer, workstation, personal digital assistant, mobile telephone, or any other device capable of providing an effective user interface with a server and/or database. Specifically, client device 512 includes one or more processors, a memory, a display, a keyboard, a graphical pointer or selector, etc. The client device memory preferably includes a browser application for displaying interfaces generated by the servers 502.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A computer implemented method for facilitating social engineering campaigns, the method comprising:
    maintaining, by a computer, at least one database comprising:
        metadata for a plurality of fictional personas;
        metadata for a plurality of potential targets;
        information for a plurality of social engineering campaigns, including a plurality of campaign scenarios; and
        information regarding social engineering successes with respect to at least one of: at least one fictional persona, at least one potential target, at least one social engineering campaign, or a combination thereof;
    receiving, by the computer, a selection of a campaign scenario from the plurality of campaign scenarios;
    receiving, by the computer, a selection of at least one of the plurality of potential targets;
    selecting, by the computer, at least one of the plurality of fictional personas for use in a social engineering campaign based on an expected effectiveness of the at least one of the plurality of fictional personas, the expected effectiveness determined based at least in part on metadata associated with the selected at least one of the plurality of potential targets;
    populating, by the computer, a communication template associated with the selected campaign scenario with metadata for a selected target and a selected fictional persona;
    sending, by the computer, a communication using the populated communication template to the selected target;
    tracking, by the computer, interactions with the selected target;
    accessing, by a dialog manager computer, the at least one database, the selection of the campaign scenarios, the selected target, the populated communication template and the tracked interactions with the selected target; and
    managing, by the dialog manager computer, a plurality of states and a flow of communications with the selected target.

2. The method of claim 1, wherein selecting at least one of the plurality of fictional personas for use in the social engineering campaign is performed at least in part using at least one model trained to identify fictional personas.

3. The method of claim 2, wherein the at least one model is trained using metadata for a plurality of potential targets and success information associated therewith as input.

4. The method of claim 2, wherein the at least one model is trained using metadata for a plurality of fictional personas and success information associated therewith.

5. The method of claim 2, wherein the at least one model is trained using campaign parameters for a plurality of campaigns and success information associated therewith.

6. The method of claim 5, wherein the campaign parameters include communication channels and wherein the at least one model is trained using success information associated with the communication channels.

7. The method of claim 5, wherein each of the scenarios has content associated therewith, and wherein the at least one model is trained using success information associated with the scenario content.

8. The method of claim 1, comprising receiving a selection of a campaign goal and setting initial campaign parameters based on the selected goal.

9. The method of claim 8, wherein the initial campaign parameters comprise a communication channel, a scenario, and fictional persona metadata.

10. The method of claim 1, wherein at least some of the metadata for the plurality of potential targets is retrieved from one or more public sources and wherein the plurality of states include an initialization state, an update state, an information update state and an end state.

11. The method of claim 1, comprising receiving at least one item of metadata for a fictional persona and generating using at least one model at least one other item of metadata for the fictional persona conforming to metadata received; wherein the fictional persona conforming to metadata received includes conforming to a regional norm and a cultural norm.

12. The method of claim 11, wherein the fictional persona is a company and wherein the at least one item of metadata received comprises an industry type and location and wherein the at least one other item of metadata comprises a company name.

13. The method of claim 11, wherein the fictional persona is a company and wherein the at least one other item of metadata comprises company structure.

14. The method of claim 13, wherein the company structure comprises a plurality of company employees and at least one company address.

15. The method of claim 11, wherein the fictional persona is a company and wherein the at least one other item of metadata comprises a domain name for the company website.

16. The method of claim 1, wherein selecting at least one of the plurality of fictional personas for use in a social engineering campaign comprises providing an interface that includes a list of fictional personas, a list of potential targets, and at least one form element for a user to refine the list of fictional personas based on a score for the fictional personas regarding effectiveness of each of the fictional persona with respect to at least one of the potential target listed.

17. A computer implemented method for facilitating social engineering campaigns, the method comprising:
    receiving, by a computer, at least one item of metadata for a first fictional persona;
    generating, by the computer, using at least one trained model, at least one other item of metadata for the fictional persona conforming to metadata received;
    maintaining, by the computer, at least one database comprising:
        metadata for a plurality of fictional personas, including the first fictional persona;
        metadata for a plurality of potential targets;
        information for a plurality of social engineering campaigns, including a plurality of campaign scenarios; and information regarding social engineering successes with respect to at least one of: at least one fictional persona, at least one potential target, at least one social engineering campaign, or a combination thereof;

receiving, by the computer, a selection of a campaign scenario from the plurality of campaign scenarios;

receiving, by the computer, a selection of at least one of the plurality of potential targets;

selecting, by the computer, at least one of the plurality of fictional personas for use in a social engineering campaign using the at least one trained model, the selection based on an expected effectiveness of the at least one of the plurality of fictional personas with respect to the selected at least one of the plurality of potential targets, the at least one trained model trained with respect to expected effectiveness using as input:
- metadata for a plurality of potential targets and success information associated therewith as input;
- metadata for a plurality of fictional personas and success information associated therewith;
- campaign parameters for a plurality of campaigns and success information associated therewith; or populating, by the computer, a communication template associated with the selected campaign scenario with metadata for a selected target and a selected fictional persona;

sending, by the computer, a communication using the populated communication template to the selected target;

tracking, by the computer, interactions with the selected target;

accessing, by a dialog manager computer, the at least one database, the selection of the campaign scenarios, the selected target, the populated communication template and the tracked interactions with the selected target; and managing, by the dialog manager computer, a plurality of states and a flow of communications with the selected target.

18. The method of claim 17, wherein generating the at least one other item of metadata for the fictional persona conforming to metadata received includes conforming to a regional norm and a cultural norm and wherein the campaign parameters include communication channels and wherein the at least one trained model is trained using success information associated with the communication channels.

19. The method of claim 17, wherein each of the scenarios has content associated therewith, and wherein the at least one trained model is trained using success information associated with the scenario content and wherein the plurality of states include an initialization state, an update state, an information update state and an end state.

20. The method of claim 17, wherein selecting at least one of the plurality of fictional personas for use in a social engineering campaign comprises providing an interface that includes a list of fictional personas, a list of potential targets, and at least one form element for a user to refine list of fictional personas based on a score for the fictional personas regarding effectiveness of each of the fictional persona with respect to at least one of the potential target listed.

* * * * *